Nov. 25, 1947.  F. W. SCHWINN  2,431,513
CHAIN SHIFTING DEVICE FOR BICYCLES AND THE LIKE
Filed Oct. 21, 1944  2 Sheets-Sheet 1
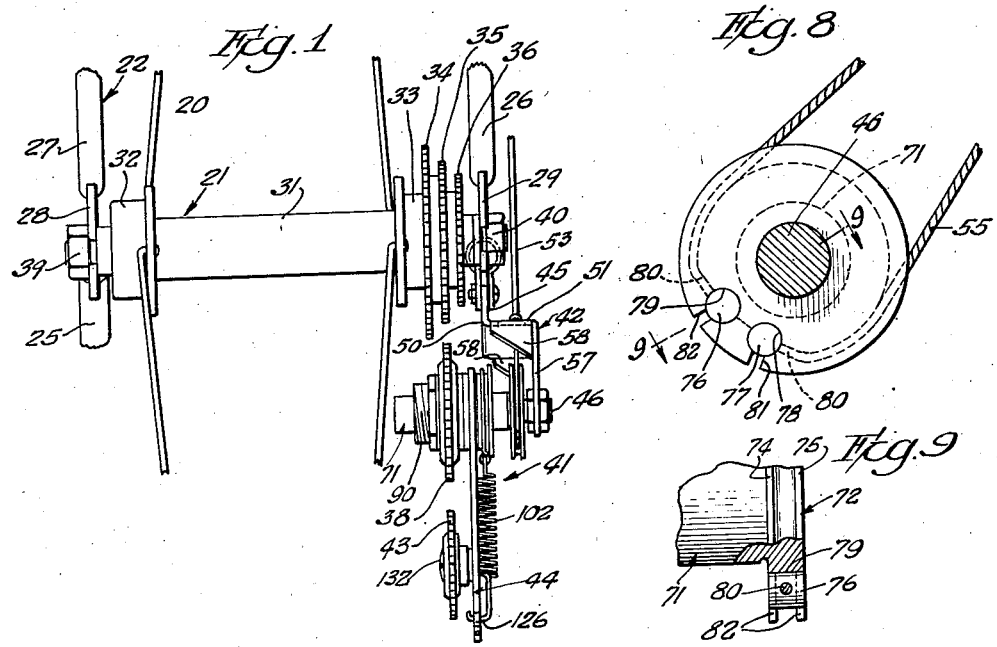
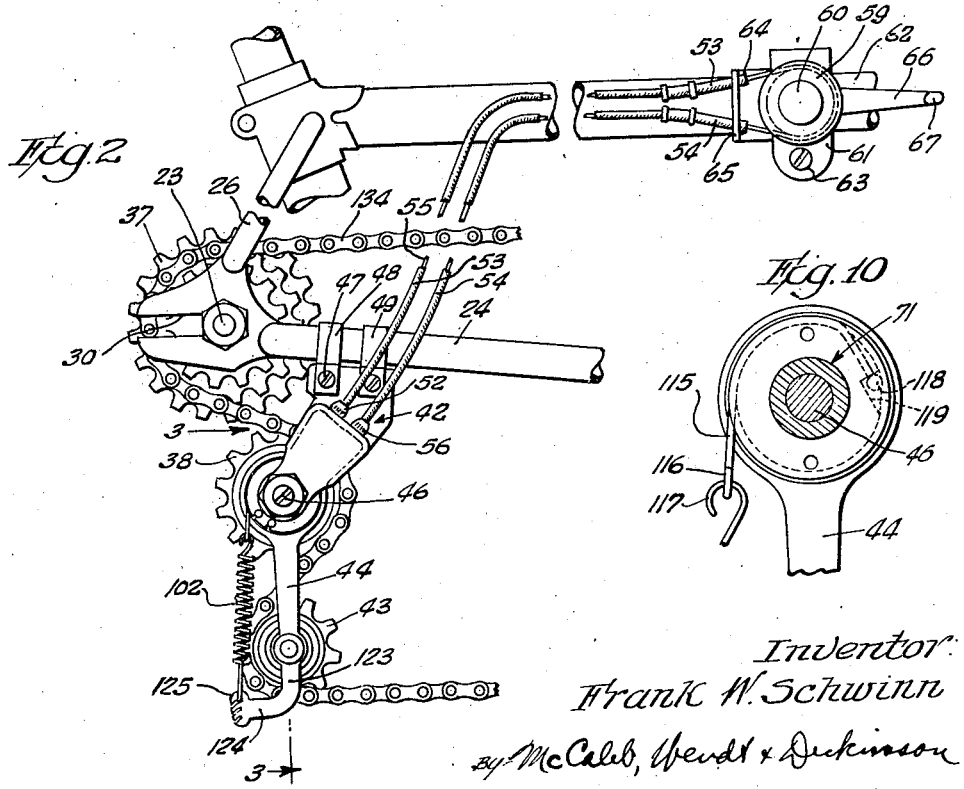
Inventor:
Frank W. Schwinn
By McCaleb, Wendt & Dickinson
Attys.

Nov. 25, 1947.   F. W. SCHWINN   2,431,513
CHAIN SHIFTING DEVICE FOR BICYCLES AND THE LIKE
Filed Oct. 21, 1944   2 Sheets-Sheet 2
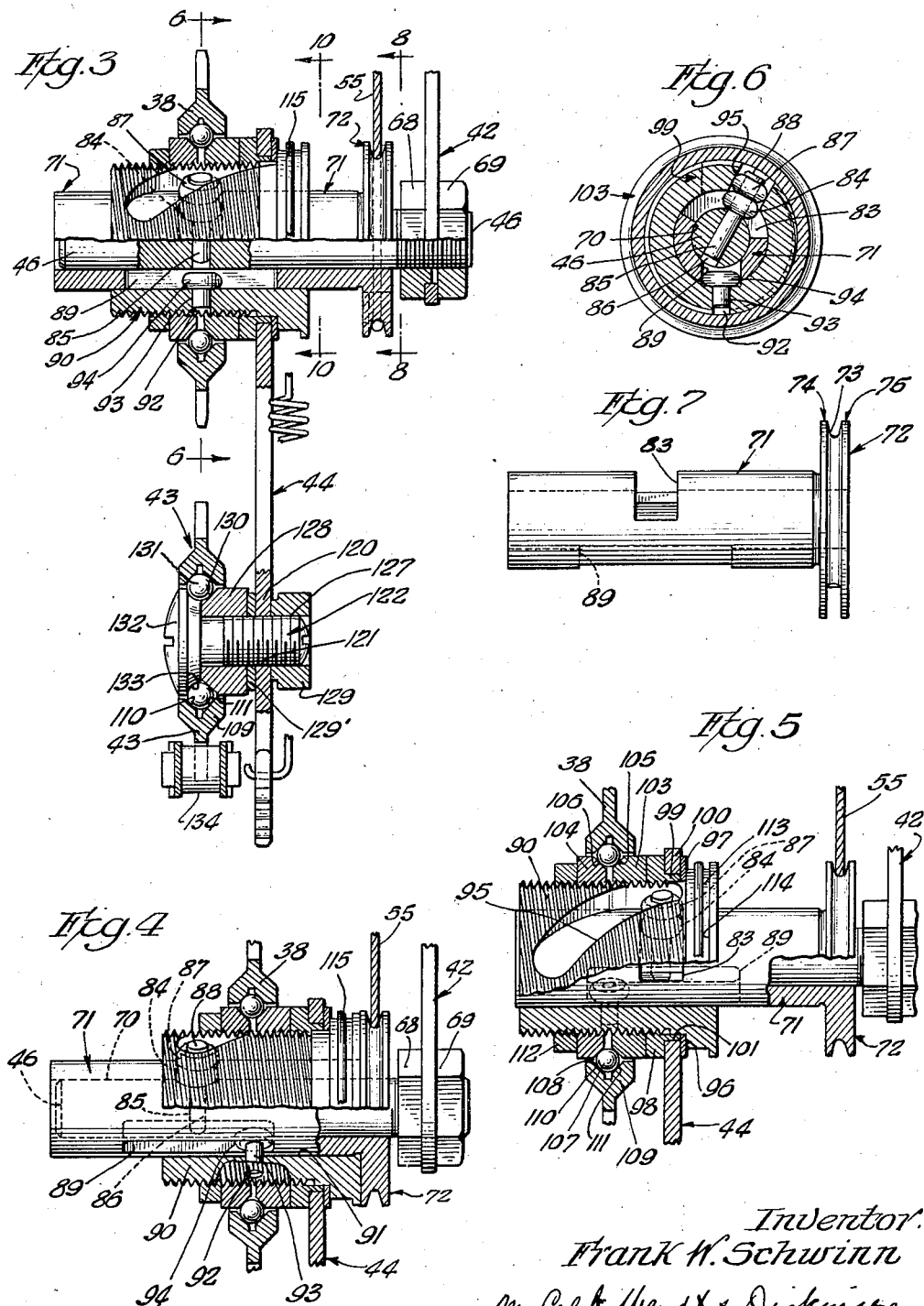
Inventor:
Frank W. Schwinn
By McCaleb, Wendt & Dickinson
Attys.

Patented Nov. 25, 1947

2,431,513

UNITED STATES PATENT OFFICE 2,431,513

CHAIN SHIFTING DEVICE FOR BICYCLES AND THE LIKE

Frank W. Schwinn, Chicago, Ill.

Application October 21, 1944, Serial No. 559,702

11 Claims. (Cl. 74—217)

The present application relates to devices for effecting a change of speed of bicycles, and is particularly concerned with devices adapted to accomplish this result by shifting the chain from one sprocket to another.

In the devices of the prior art of this type, it is customary to actuate the shifting device by means of a cable or flexible member of the Bowden wire type acting on a pulley, but the devices of the prior art are equipped with such pulleys that also move axially with the guiding sprocket. Thus, the pulley tends to get out of alignment with its cable or wire. Such actuating cables or wires are adapted to work best and to give the longest service when they are not bent laterally with respect to the pulley, or other member upon which they act, and when they are kept in alignment with such pulleys. For example, a kink or sharp bend in a Bowden wire is apt to produce an obstruction to its operation, and may eventually cause the wire to run off its pulley and cause other operational troubles.

One of the objects of the present invention is the provision of an improved sprocket chain shifting device which is adapted to effect a shift of the guiding sprocket while maintaining the axial position of the pulley on which the Bowden wire works.

Another object of the invention is the provision of an improved guide sprocket shifting device which is simple, sure in its action, and adapted to be operated with a minimum amount of effort.

Another object of the invention is the provision of an improved speed-change device of the chain shifting type, which is adapted to be manufactured economically and which is adaptable for use on various standard types of bicycles, and which may be used for a long period of time with positive results and with a minimum amount of attention or repair to keep the device in a good state of operation.

Another object is the provision of a chain shifting device which operates smoothly in its transition from one speed to another so that there is no cessation or interruption of the driving force applied to the driving wheel of the bicycle, and which involves a minimum amount of friction in the driving mechanism so that the bicycle may operate with a minimum amount of effort.

Other objects and advantages of the invention will be apparent from the following description and the accompanying drawings, in which similar characters of reference indicate similar parts throughout the several views.

Referring to the drawings, of which there are two sheets,

Fig. 1 is a fragmentary rear elevational view of the chain shifting device, with the chain removed and the device applied to the rear wheel of a bicycle;

Fig. 2 is a fragmentary side elevational view, taken from the right side of Fig. 1, with the chain in place;

Fig. 3 is a sectional view, taken on various planes, indicated by the line 3—3 of Fig. 2, looking in the direction of the arrows, showing the details of construction of the attachment for shifting the chain, with the guiding sprocket in the central position;

Fig. 4 is a similar fragmentary view, showing only the guiding sprocket, with this sprocket in the position which it assumes when it and the wheel is being driven at the highest speed, by means of a smaller sprocket on the wheel;

Fig. 5 is a view similar to Fig. 4, showing the same mechanism in the position which it assumes when the chain is on the largest sprocket, for slow speed and maximum power;

Fig. 6 is a sectional view, taken on the plane of the line 6—6 of Fig. 3, looking in the direction of the arrows;

Fig. 7 is a side elevational view of the actuating pulley and the tubular shaft carried by it;

Fig. 8 is a fragmentary side elevational view of the pulley of Fig. 7, showing the mode of attachment of the cable, taken on the line 8—8 of Fig. 3, looking in the direction of the arrows;

Fig. 9 is a fragmentary sectional view, taken on the plane of the line 9—9 of Fig. 8, looking in the direction of the arrows;

Fig. 10 is a fragmentary sectional view, taken on the plane of the line 10—10 of Fig. 3, looking in the direction of the arrows.

Referring to Fig. 1, 20 indicates in its entirety a bicycle, fragments of the rear wheel 21 and frame 22 being shown in this figure.

The rear fork, which supports the shaft 23 for the rear wheel 21, comprises the lower rear fork members 24 and 25 and the upper rear fork members 26 and 27. The upper and lower rear fork members on each side are joined by the integral, flat, shaft-supporting portions 28 and 29, each of which is provided with a slot 30 for receiving the shaft 23.

The wheel 21 is provided with a tubular body 31, carrying an enlarged hub 32 at its left end, which contains the antifriction bearings, such as a pair of races and balls for supporting the wheel on the shaft 23 at this end. At its opposite end the wheel 21 preferably has an enlarged hub 33, which not only contains the ball bearings, but preferably also includes a freewheeling device whereby the wheel 21 may run ahead of its driving sprockets, but whenever the sprockets are driven the wheel is driven at the same speed, in a forward direction.

The hub 33 preferably supports a plurality of sprockets 34—36 of different size and different number of teeth, the sprockets being preferably graduated in size so that the smaller is toward the outside. These sprockets are fixedly secured to the hub 33 to drive the wheel 21.

The sprockets 34—36 preferably have their teeth 37 of blunt rectangular shape as viewed from the outer edge, with a bevel on each outer corner. This bevel facilitates the transition of the chain from one sprocket to the other. As distinguished from this, the guiding sprocket 38 preferably has its teeth of blunt rectangular peripheral outline, without bevel, so as to be better adapted to guide the chain without jumping off the sprocket 38.

The shaft 23 is fixedly secured in the rear fork by means of the clamping nuts 39, 40. The chain shifting device may be indicated in its entirety by the numeral 41, and it preferably includes a supporting bracket 42, a guiding or chain shifting sprocket 38, and an idler sprocket 43, carried by an idler arm 44.

The bracket 42 may comprise a sheet metal member which is formed with an upwardly extending attaching flange 45 of substantially trapezoidal shape, as shown in Fig. 2, so that it may support the shaft 46 for the shifting sprocket 38 downwardly and rearwardly of the upper part of the bracket.

The attaching flange 45 is provided with a pair of apertures for receiving the screw bolts 47, each of which passes through a clamping band 48, 49 that is clamped about the lower right rear fork member 24 by these screw bolts and their nuts. Thus bracket 42 is secured fixedly to the frame.

The bracket is preferably turned outwardly at right angles at 50 and provided with a relatively flat portion 51, which has slots 52 for receiving the end portions of the cable housings 53, 54 of the Bowden wire 55, by means of which the device is controlled. The nuts 56 secure these cable housings to the bracket 42.

The flat portion 51 of the bracket 42 has a downwardly and backwardly extending shaft-supporting flange 57, which is provided with an aperture for receiving the shaft 46 of the guiding sprocket 38. This flange 57 may be reinforced by being welded or otherwise attached to a pair of side flanges 58 depending from the flat portion 51 of the bracket.

The Bowden wire 55 may be all in one length, with its central portion suitably anchored or having driving engagement with a controlling pulley 59, which is rotatably mounted upon a stud 60 carried by a clamping band 61. The clamping band 61 is clamped about the upper tube member 62 of the bicycle frame by means of a screw bolt 63. It preferably has an attaching flange 64, with a transverse portion 65, in which the housing members 53 and 54 of the Bowden wire are anchored at the upper end.

The Bowden wire housings 53 are, of course, provided with suitable clamps or securing devices for holding them to the frame of the bicycle at points in between the controlling pulley 59 and the sprocket shifting device 41.

The controlling pulley 59 has a radially extending lever 66, with a laterally bent end portion 67, by means of which the pulley 59 may be rotated to drive the Bowden wire 55, that portion of the wire which extends about the pulley 59 moving with the pulley.

Referring now to Fig. 3, the shaft 46 is secured to the bracket 42 in fixed relation by means of its threaded end portion and a pair of nuts 68, 69. The shaft 46 has a cylindrical portion 70 for rotatably supporting a sleeve 71 (Figs. 4 and 7) which carries the pulley 72, which is engaged by the ends of the Bowden wire 55.

The pulley 72 has the peripherally extending V-shaped groove 73, which has an easy bend at its apex for accommodating the cable or wire 55. The groove 73 is defined by the radially extending side flanges 74, 75.

In order to secure the ends of the wire or cable 55, these ends are provided with small cylindrical buttons 76, 77, which are locked in the complementary cylindrical recesses 78, 79 in the body of the pulley 72.

Since the pulley 72 is actuated by a pull or tension on the cable 55, this cable may be of the stranded type, and it may have its ends splayed outward and secured in the cylindical buttons 76, 77 of hard solder or other meltable material.

The pulley has its recesses 78, 79 communicating with the groove 73 by means of deeper grooved portions 80 and flanges, such as the flanges 75, are provided with the slots 81, 82, communicating with the recesses 78, 79. Thus, when the cable has slack, cable 55, with the button 77, may be placed in such position that as the button 77 slides into its recess 78, the cable 55 passes through the slot 81. Then, as the button 77 becomes centered in the pulley, the cable may pass down into the grooved portion 80, and tension on the cable locks the button in its recess.

The sleeve 71 is provided with a peripherally extending groove 83 of substantially rectangular cross section located substantially midway between its ends and adapted to engage the innermost roller 84 carried by a pin 85, which is fixedly secured by means of a frictional fit in a transverse bore 86 in a shaft 70.

The pin 85 is of substantially cylindrical shape and carries a pair of similar rollers 84, 87, which are retained by means of a small riveted member 88. Roller 84 is of sufficient diameter to have a rotating and sliding fit in the groove 83, and it is preferably provided with a cross sectional shape so that its periphery is laterally rounded.

The thickness of roller 84 is such that it is housed in the groove 83, and it does not project substantially beyond the external cylindrical surface of sleeve 71 so that roller 84 engages only the walls of groove 83 and sleeve 71. Thus the sleeve 71 is permitted to move in a rotational direction, but not in an axial direction, and the pulley 72, which engages the cable 55, is held against axial movement so that it is always in position to receive the cable as the cable emerges from its housing members 53, 54.

The sleeve 71 is also provided with a longitudinally extending slot 89, preferably on the side opposite to the peripheral slot 83, and the sleeve 71 slidably and rotatably supports a threaded sprocket supporting sleeve 90.

The sprocket supporting sleeve 90 comprises a substantially cylindrical metal member having an axial bore 91, which has a sliding and rotating fit on the sleeve 70. The sprocket supporting sleeve 90 has a radially extending bore 92 for fixedly supporting a pin 93, and pin 93 carries a roller 94 similar to those previously described, and of sufficient size to rotate and slide in the slot 89 of sleeve 71.

Thus, the sprocket supporting sleeve 90 is guided for axial movement on the sleeve 71, but cannot rotate with respect to sleeve 71. The sprocket supporting sleeve 90 is also provided with a curved diagonally extending slot 95, which extends longitudinally of sleeve 90 and also peripherally, and which is adapted to receive the outer roller 87 carried by the pin 85 on shaft 70.

The sprocket supporting sleeve 90 preferably has an annular shoulder 96 for engaging a washer 97 and a nut 98 with a reduced cylindrical trunnion portion 99 threaded on the sleeve 90 into engagement with the washer 97. The idler arm 44 has an enlarged circular bearing portion 100, with a bore 101 that rotatably receives the tubular trunnion portion 99 of the nut 98.

Thus, the idler arm 44 is rotatably mounted on the sprocket supporting sleeve 90 for free rotation, but it is restrained by a spring 102, further to be described.

In addition to the nut 98 on the sleeve 90, this sleeve supports a pair of cone nuts 103, 104, which may be substantially cylindrical metal members, each of which is provided with a conical surface 105, 106 for engagement with the balls 107.

The guide sprocket 38 comprises a sprocket provided with a centrally located bore 108 located in a hub 109. The hub also has a pair of opposed frusto-conical surfaces 110, 111 defining an inner groove for receiving and engaging the balls 107.

A lock nut 112 holds the races 103, 104 in predetermined position, and thus the sprocket 38 is supported for free rotation on the sleeve 90, with a minimum amount of friction.

The sprocket supporting sleeve 90 also has an enlarged pulley portion 113 provided with a groove 114 for receiving the tension member 115 (Fig. 10). The tension member 115 may consist of a wire or cable provided with a loop or eye 116 at its outer end for engaging the hook-shaped end portion 117 of the helical tension spring 102.

The tension member 115 lies in the groove 114 and has its inner end provided with a button 118 similar to the buttons 76, 77 previously described, the button being housed in a recess 119 which communicates with the groove 114. The idler supporting arm 44 is provided with an enlargement 120 having a through bore 121 for supporting a stub shaft 122. Below this the idler supporting arm 44 has a downward extension 123, which is bent backwardly at 124 and provided with a plurality of rearwardly and downwardly curved grooves 125.

These grooves are adapted to engage the lower hooked end portion 126 of tension spring 102, and the spring is provided with an initial tension which tends to pull the sprocket supporting sleeve 90 in a counterclockwise direction in Fig. 2. This tension may be regulated by hooking the end portion 126 in the various grooves 125 of the idler arm 44, the grooves being at different distances from sprocket supporting member 90.

Spring 102 thus urges the sleeve 90 constantly in a counterclockwise direction and urges the walls of slot 95 against the roller 87 on one side of the slot 95, thus tending to take up any backlash and to assure the positive operation of the device.

The stub shaft 122 has a threaded end portion 127, which receives the two nuts 128, 129 that clamp the stub shaft 122 to the idler arm 44. A washer 129 of the locking type may be interposed between the arm 44 and the nut 128. The nut 128 is preferably provided with a conical surface 130 at its outer corner for engaging with the balls 131, and the stub shaft 122 preferably has a head 132 with an inner curved or conical surface 133 for engaging the balls 131.

The idler sprocket 43 may be of similar construction to the guiding sprocket 38 in that it also has a similar hub 109 provided with conical surfaces 110, 111 for engaging the balls 131. Thus, the idler sprocket 43 is supported for free rotation on the stub shaft 122 with a minimum amount of friction.

The sprocket chain 134 may be of the usual construction, and it passes about the driving sprocket which is located on the crank shaft of the bicycle in the usual way. At the lower end of the driving sprocket the chain 134 passes backwardly about the idler sprocket 43, thence upwardly in front of and around one side of the guiding sprocket 38, thence about one of the sprockets 34—36, and thence back to the crank shaft sprocket.

It will be noted that the guiding sprocket 38 is in front of and below the driven sprockets 34—36 so as to guide the chain to one or the other of the driven sprockets.

The operation of my chain shifting device is as follows:

Referring first to Figs. 3–5, it will be seen that the shaft 46 is fixed. It carries a pin 85 with the two rollers 84, 87, the pin being fixed. The roller 84 engages in the slot 83 of sleeve 71 and permits the sleeve 71 to rotate on the shaft 46, but not to move axially.

The roller 87, carried by the pin 85, which is fixedly mounted on the fixed shaft 46, engages in the screw-shaped slot 95 of the outer sprocket supporting sleeve 90. Thus the sprocket supporting sleeve 90 may rotate and move axially, provided it is guided in this motion by the roller 87. When the sleeve 90 is moved axially, it must rotate. When it is rotated, it must move axially.

The sleeve 90 has a pin 93, with a roller 94 that engages in the longitudinal slot 89 of the sleeve 71. Thus sleeve 90 cannot rotate with respect to the sleeve 71. It must move axially on the sleeve 71. When the pulley 72 is rotated, this rotates the sleeve 71. The sleeve 71 engages the roller 94, which is carried by the pin 93, rotating the sprocket sleeve 90. The sprocket sleeve 90 is, however, prevented from any rotation by the roller 87. The sprocket sleeve 90 moves axially on the sleeve 71. This is permitted by the roller 94 moving longitudinally in groove 89.

Thus, a rotation of the pulley 72 causes the sleeve 90 to move axially. The slight amount of rotation also produced is of no consequence. Axial movement of sleeve 90 shifts the sprocket 38 to one of three positions, that found in Fig. 3, middle speed; that found in Fig. 4, high speed; and that found in Fig. 5, low speed.

When the handle 67 is pulled upward, the cable 55 exerts a tension on the lower side of the pulley 72 and rotates the pulley counterclockwise. The pulley 72 rotates the sleeve 71 counterclockwise, and sleeve 71 through roller 94 and slot 89 tends to rotate sleeve 90 counterclockwise. When the sleeve 90 moves counterclockwise, it must also move axially toward the left.

When the handle 66 is in the middle position, guiding sprocket 38 is in the middle position of Fig. 3. Upward movement of the handle 66 will thus cause the sleeve 90 to move toward the left to the position of Fig. 5; the sprocket 38 will then move from the position of Fig. 3 in alignment with sprocket 35 to the position of Fig. 5, where it is in alignment with the sprocket 34.

As it does this, the chain is guided from the sprocket 35 to the sprocket 34. The additional slack that is required to go around the larger sprocket is provided by the idler sprocket 43, which moves forward slightly in Fig. 2, extending the spring 102. The spring 102 merely keeps the lower section of chain 134 taut, and the driving tension is on the upper part of the chain 134.

In a similar way, downward movement of the lever 66 back to the position of Fig. 2 will cause the guiding sprocket 43 to move from alignment with the driven sprocket 34 to alignment with the driven sprocket 35, and the chain will be guided on the driven sprocket 35.

As it does so the slack will be taken up by the idler sprocket 43 and the spring 102. Finally, the movement of the lever 66 to its dotted line position of Fig. 2 moves the guiding sprocket 38 to the position of Fig. 4, where the chain is guided on the smaller driven sprocket 36, giving a maximum speed.

During all of these shifting movements of the guiding sprocket the cable pulley 72 does not move axially, and consequently it is always in position to receive the Bowden wire or cable 55 with a minimum amount of lateral bending.

It will thus be observed that I have invented an improved chain shifting device, the structure of which is simple and effective, and which may be manufactured at a low cost. The operation of this shifting device is positive, and it is adapted to be used for a long period of time without mechanical derangement or necessity for repair. As distinguished from the prior art devices, in which the Bowden wire pulley also shifts laterally, my invention accomplishes the shifting of the guiding sprocket without moving the Bowden wire pulley out of its proper position.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a chain shifting arrangement for speed change of a bicycle, a combination of a bicycle frame, a rear wheel shaft supported thereby, and a rear wheel carried by said shaft, having a plurality of sprockets of different sizes, a supporting bracket carried by said frame and having a depending arm, a shaft carried by said arm and extending in parallelism with the rear wheel shaft, a sleeve mounted on said latter shaft and rotatably carrying a guide sprocket, said sleeve being axially shiftable on said latter shaft, an idler supporting arm carried by said sleeve, and an idler rotatably mounted on said arm, said idler being in alignment with said guide sprocket, and means carried by said second shaft, including a pulley mounted for rotation and fixed against axial movement, and operative mechanical connections between said pulley and said first-mentioned sprocket supporting sleeve for moving the sprocket supporting sleeve axially when the pulley rotates, said operative mechanical connections comprising a pin carried by said shaft engaging in a helical cam slot in said first-mentioned sleeve, and a second pin carried by said sleeve and engaging in an axial slot carried by a second sleeve actuated by said pulley.

2. In a chain shifting arrangement for speed change of a bicycle, the combination of a bicycle frame, a rear wheel shaft supported thereby, and a rear wheel carried by said shaft, having a plurality of sprockets of different sizes, a supporting bracket carried by said frame and having a depending arm, a shaft carried by said arm and extending in parallelism with the rear wheel shaft, a sleeve mounted on said latter shaft and rotatably carrying a guide sprocket, said sleeve being axially shiftable on said latter shaft, an idler supporting arm carried by said sleeve, and an idler rotatably mounted on said arm, said idler being in alignment with said guide sprocket, and means carried by said second shaft, including a pulley mounted for rotation and fixed against axial movement, and operative mechanical connections between said pulley and said first-mentioned sprocket supporting sleeve for moving the sprocket supporting sleeve axially when the pulley rotates, said operative mechanical connections comprising a pin carried by said shaft engaging in a helical cam slot in said first-mentioned sleeve, and a second pin carried by said sleeve and engaging in an axial slot carried by a second sleeve actuated by said pulley, said second sleeve having a peripherally extending slot engaging a part carried by said first pin for preventing axial movement of the pulley.

3. In a chain shifting arrangement for speed change of a bicycle, the combination of a bicycle frame, a rear wheel shaft supported thereby, and a rear wheel carried by said shaft, having a plurality of sprockets of different sizes, a supporting bracket carried by said frame and having a depending arm, a shaft carried by said arm and extending in parallelism with the rear wheel shaft, a sleeve mounted on said latter shaft and rotatably carrying a guide sprocket, said sleeve being axially shiftable on said latter shaft, an idler supporting arm carried by said sleeve, and an idler rotatably mounted on said arm, said idler being in alignment with said guide sprocket, and means carried by said second shaft, including a pulley mounted for rotation and fixed against axial movement, and operative mechanical connections between said pulley and said first-mentioned sprocket supporting sleeve for moving the sprocket supporting sleeve axially when the pulley rotates, said operative mechanical connections comprising a pin carried by said shaft engaging in a helical cam slot in said first-mentioned sleeve, and a second pin carried by said sleeve and engaging in an axial slot carried by a second sleeve actuated by said pulley, said second sleeve having a peripherally extending slot engaging a part carried by said first pin for preventing axial movement of the pulley, each of said pins being provided with rollers for engaging the walls of their respective slots.

4. In a guiding structure for effecting a shift of a chain from a larger to a smaller sprocket, or vice versa, the combination of a supporting bracket, said bracket being arranged to be secured to a bicycle frame, and a shaft fixedly carried by said bracket to extend in axial alignment with the rear wheel shaft, an actuating sleeve rotatably and non-slidably mounted on said shaft, a guide sprocket supporting sleeve rotatably and slidably mounted on said actuating sleeve, means carried by said guide sprocket supporting sleeve for preventing it from rotating with respect to the actuating sleeve, and camming formations on said guide sprocket sleeve for engaging a fixed member carried by said shaft and causing said guide sprocket supporting sleeve to slide axially as the actuating sleeve is rotated.

5. In a guiding structure for effecting a shift of a chain from a larger to a smaller sprocket, or vice versa, the combination of a supporting bracket, said bracket being arranged to be secured to a bicycle frame, and a shaft fixedly carried by said bracket to extend in axial alignment with the rear wheel shaft, an actuating sleeve rotatably and non-slidably mounted on said shaft, a guide sprocket supporting sleeve rotatably and slidably mounted on said actuating sleeve, means carried by said guide sprocket supporting sleeve for preventing it from rotating with respect to the actuating sleeve, and camming formations on said guide sprocket sleeve for engaging a fixed member carried by said shaft and causing said guide sprocket supporting sleeve to slide axially as the actuating sleeve is rotated, said actuating sleeve being provided with a pulley adapted to have actuating cables secured to it.

6. In a guiding structure for effecting a shift of a chain from a larger to a smaller sprocket, or vice versa, the combination of a supporting bracket, said bracket being arranged to be secured to a bicycle frame, and a shaft fixedly carried by said bracket to extend in axial alignment with the rear wheel shaft, an actuating sleeve rotatably and non-slidably mounted on said shaft, a guide sprocket supporting sleeve rotatably and slidably mounted on said actuating sleeve, means carried by said guide sprocket supporting sleeve for preventing it from rotating with respect to the actuating sleeve, and camming formations on said guide sprocket sleeve for engaging a fixed member carried by said shaft and causing said guide sprocket supporting sleeve to slide axially as the actuating sleeve is rotated, said actuating sleeve being provided with a pulley adapted to have actuating cables secured to it and said camming formations comprising a helically extending slot.

7. In a guiding structure for effecting a shift of a chain from a larger to a smaller sprocket, or vice versa, the combination of a supporting bracket, said bracket being arranged to be secured to a bicycle frame, and a shaft fixedly carried by said bracket to extend in axial alignment with the rear wheel shaft, an actuating sleeve rotatably and non-slidably mounted on said shaft, a guide sprocket supporting sleeve rotatably and slidably mounted on said actuating sleeve, means carried by said guide sprocket supporting sleeve for preventing it from rotating with respect to the actuating sleeve, and camming formations on said guide sprocket sleeve for engaging a fixed member carried by said shaft and causing said guide sprocket supporting sleeve to slide axially as the actuating sleeve is rotated, said actuating sleeve being provided with a pulley adapted to have actuating cables secured to it, said camming formations comprising a helically extending slot, and said means for causing the guide sprocket supporting sleeve to move axially comprising a pin having a part engaging in said slot, said pin being carried by said shaft.

8. A guiding structure for effecting a shift of a chain from a larger to a smaller sprocket, or vice versa, the combination of a supporting bracket, said bracket being arranged to be secured to a bicycle frame, and a shaft fixedly carried by said bracket to extend in axial alignment with the rear wheel shaft, an actuating sleeve rotatably and non-slidably mounted on said shaft, a guide sprocket supporting sleeve rotatably and slidably mounted on said actuating sleeve, means carried by said guide sprocket supporting sleeve for preventing it from rotating with respect to the actuating sleeve, and camming formations on said guide sprocket sleeve for engaging a fixed member carried by said shaft and causing said guide sprocket supporting sleeve to slide axially as the actuating sleeve is rotated, said actuating sleeve being provided with a pulley adapted to have actuating cables secured to it, said camming formations comprising a helically extending slot, and said means for causing the guide sprocket supporting sleeve to move axially comprising a pin having a part engaging in said slot, said pin being carried by said shaft, and said pin also having a part engaging a peripheral slot in the actuating sleeve for preventing axial movement of the actuating sleeve.

9. In a guiding structure for effecting a shift of a chain from a larger to a smaller sprocket, or vice versa, the combination of a supporting bracket, said bracket being arranged to be secured to a bicycle frame, and a shaft fixedly carried by said bracket to extend in axial alignment with the rear wheel shaft, an actuating sleeve rotatably and non-slidably mounted on said shaft, a guide sprocket supporting sleeve rotatably and slidably mounted on said actuating sleeve, means carried by said guide sprocket supporting sleeve for preventing it from rotating with respect to the actuating sleeve, and camming formations on said guide sprocket sleeve for engaging a fixed member carried by said shaft and causing said guide sprocket supporting sleeve to slide axially as the actuating sleeve is rotated, said actuating sleeve being provided with a pulley adapted to have actuating cables secured to it, said camming formations comprising a helically extending slot, and said means for causing the guide sprocket supporting sleeve to move axially comprising a pin having a part engaging in said slot, said pin being carried by said shaft, and said pin also having a part engaging a peripheral slot in the actuating sleeve for preventing axial movement of the actuating sleeve, said guide sprocket supporting sleeve having a pin extending inwardly into an axial slot in said actuating sleeve to prevent relative rotation between the two sleeves.

10. In a guiding structure for effecting a shift of a chain from a larger to a smaller sprocket, or vice versa, the combination of a supporting bracket, said bracket being arranged to be secured to a bicycle frame, and a shaft fixedly carried by said bracket to extend in axial alignment with the rear wheel shaft, an actuating sleeve rotatably and non-slidably mounted on said shaft, a guide sprocket supporting sleeve rotatably and slidably mounted on said actuating sleeve, means carried by said guide sprocket supporting sleeve for preventing it from rotating with respect to the actuating sleeve, and camming formations on said guide sprocket sleeve for engaging a fixed member carried by said shaft and causing said guide sprocket supporting sleeve to slide axially as the actuating sleeve is rotated, said guide sprocket supporting sleeve also being provided with bearing means for supporting an idler sprocket arm, and an idler sprocket carried by said arm in alignment with the guide sprocket.

11. In a guiding structure for effecting a shift of a chain from a larger to a smaller sprocket, or vice versa, the combination of a supporting bracket, said bracket being arranged to be secured to a bicycle frame, and a shaft fixedly carried by said bracket to extend in axial alignment with the rear wheel shaft, an actuating sleeve rotatably and non-slidably mounted on said shaft, a guide sprocket supporting sleeve rotatably and slidably mounted on said actuating sleeve, means carried by said guide sprocket supporting sleeve for preventing it from rotating with respect to the actuating sleeve, and camming formations on said guide sprocket sleeve for engaging a fixed member carried by said shaft and causing said guide sprocket supporting sleeve to slide axially as the actuating sleeve is rotated, said guide sprocket supporting sleeve also being provided with bearing means for supporting an idler sprocket arm, and an idler sprocket carried by said arm in alignment with the guide sprocket, spring means engaging said arm in such direction as to tension a chain, the other end of said spring means being anchored on said guide sprocket supporting sleeve and tending to rotate it in one direction to take up backlash.

FRANK W. SCHWINN.

REFERENCES CITED

The following references are of record in the file of this patent:

UNITED STATES PATENTS

| Number | Name | Date |
|---|---|---|
| 2,225,845 | Richolt | Dec. 24, 1940 |
| 2,108,941 | Morgan | Feb. 22, 1938 |

FOREIGN PATENTS

| Number | Country | Date |
|---|---|---|
| 407,548 | Great Britain | Mar. 22, 1934 |